(12) United States Patent
Seong et al.

(10) Patent No.: US 9,802,455 B2
(45) Date of Patent: Oct. 31, 2017

(54) ELECTRONIC CONTROL SUSPENSION APPARATUS AND DAMPING FORCE CONTROLLING METHOD THEREOF

(71) Applicant: MANDO CORPORATION, Pyeongtaek-si, Gyeonggi-do (KR)

(72) Inventors: Min Sang Seong, Suwon-si (KR); Back Hyun Sung, Iksan-si (KR); Kyoung Won Park, Pyeongtaek-si (KR); Ki Haeng Cho, Iksan-si (KR); Ki Pal Ryu, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 8 days.

(21) Appl. No.: 15/157,185

(22) Filed: May 17, 2016

(65) Prior Publication Data

US 2016/0339756 A1 Nov. 24, 2016

(30) Foreign Application Priority Data

May 18, 2015 (KR) .................. 10-2015-0069051

(51) Int. Cl.
*B60G 17/016* (2006.01)
*B60W 40/09* (2012.01)
*B60G 17/06* (2006.01)

(52) U.S. Cl.
CPC ........... *B60G 17/016* (2013.01); *B60G 17/06* (2013.01); *B60W 40/09* (2013.01); *B60G 2202/24* (2013.01); *B60G 2400/10* (2013.01); *B60G 2400/204* (2013.01); *B60G 2400/208* (2013.01); *B60G 2400/34* (2013.01); *B60G 2400/37* (2013.01); *B60G 2400/41* (2013.01)

(58) Field of Classification Search
CPC .. B60G 17/016; B60G 17/06; B60G 2202/24; B60G 2400/10; B60G 2400/204; B60G 2400/208; B60G 2400/34; B60G 2400/37; B60G 2400/41; B40W 40/09
See application file for complete search history.

(56) References Cited

U.S. PATENT DOCUMENTS

| 4,555,126 | A | * | 11/1985 | Ishimitsu | ........... | B60G 17/0162 |
| | | | | | | 280/5.504 |
| 4,949,262 | A | * | 8/1990 | Buma | .................. | B60G 17/016 |
| | | | | | | 280/5.507 |
| 5,071,159 | A | * | 12/1991 | Kamimura | ........... | B60G 17/018 |
| | | | | | | 280/5.507 |

(Continued)

*Primary Examiner* — Calvin Cheung
(74) *Attorney, Agent, or Firm* — McDermott Will & Emery LLP

(57) ABSTRACT

An electronic control suspension apparatus for controlling a damping force of a damper installed at each of a front wheel and a rear wheel includes: a reception unit configured to receive a vehicle manipulation signal; a driver tendency analysis unit configured to calculate a driver tendency analysis value by analyzing a driver's driving tendency based on the vehicle manipulation signal received by the reception unit; a driver mode determination unit configured to determine a driver mode to which the driver tendency analysis value calculated by the driver tendency analysis unit belongs; and a damping force control unit configured to control the damping force of the damper by changing a current value to be applied to a solenoid valve according to the determined driver mode.

15 Claims, 5 Drawing Sheets

(56) References Cited

U.S. PATENT DOCUMENTS

| | | | | |
|---|---|---|---|---|
| 5,598,337 A * | 1/1997 | Butsuen | ............... | B60G 13/16 |
| | | | | 180/312 |
| 5,721,681 A * | 2/1998 | Borschert | ............ | B60G 17/018 |
| | | | | 280/5.507 |
| 6,502,837 B1 * | 1/2003 | Hamilton | ........... | B60G 17/0152 |
| | | | | 280/5.515 |
| 8,086,371 B2 * | 12/2011 | Furuichi | ............. | B60G 17/016 |
| | | | | 701/37 |
| 8,090,501 B2 * | 1/2012 | Furuichi | ............. | B60G 17/016 |
| | | | | 280/5.512 |
| 8,954,255 B1 * | 2/2015 | Crawford | ............ | B60W 30/143 |
| | | | | 701/70 |
| 2009/0166989 A1 * | 7/2009 | Atsushi | ............. | B60G 17/0416 |
| | | | | 280/5.503 |
| 2010/0143872 A1 * | 6/2010 | Lankteee | ............. | G09B 19/167 |
| | | | | 434/65 |
| 2012/0185136 A1 * | 7/2012 | Ohnuma | ........... | B60G 17/0195 |
| | | | | 701/48 |
| 2014/0278574 A1 * | 9/2014 | Barber | ................. | B60W 40/09 |
| | | | | 705/4 |
| 2014/0279707 A1 * | 9/2014 | Joshua | ............... | G06Q 30/0283 |
| | | | | 705/400 |
| 2014/0322676 A1 * | 10/2014 | Raman | ................ | G09B 19/167 |
| | | | | 434/65 |
| 2014/0375001 A1 * | 12/2014 | Yoshimi | ................ | B60G 17/06 |
| | | | | 280/5.516 |
| 2016/0046298 A1 * | 2/2016 | DeRuyck | ............ | B60W 40/09 |
| | | | | 340/576 |
| 2016/0243916 A1 * | 8/2016 | Kubota | ............... | B60G 17/015 |

* cited by examiner

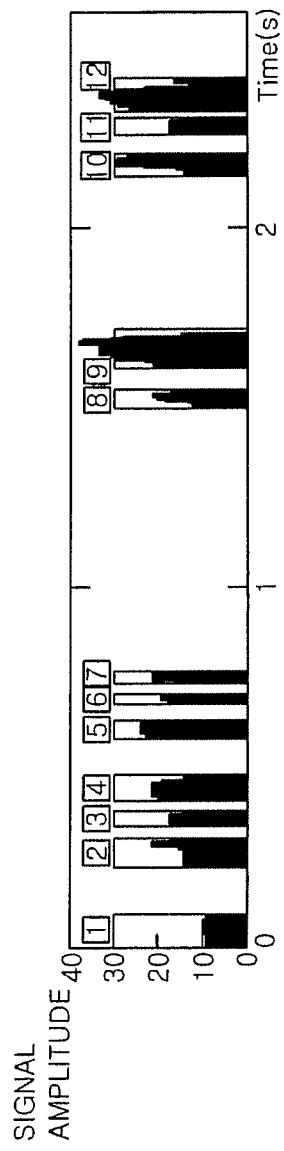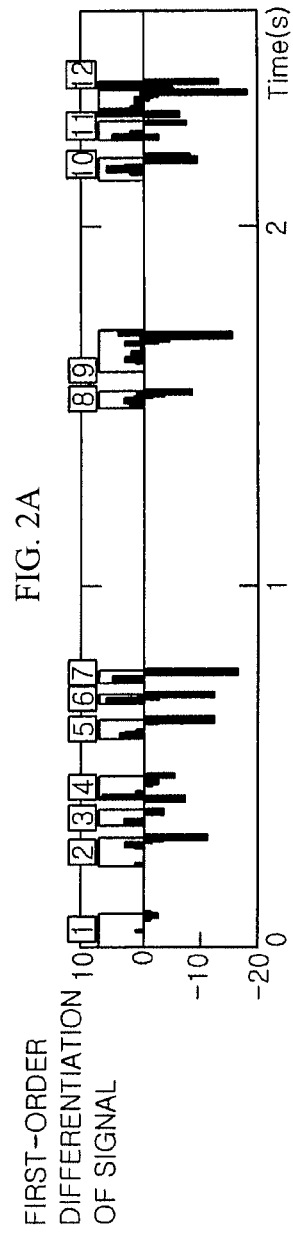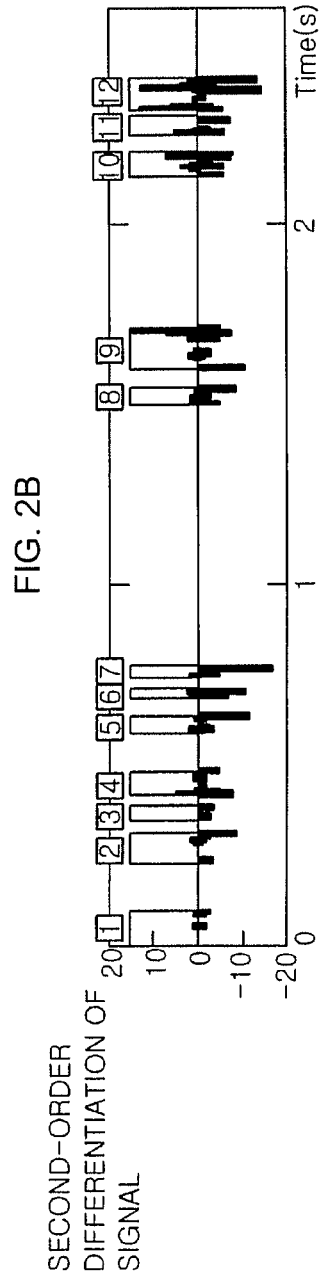
FIG. 2A
FIG. 2B
FIG. 2C

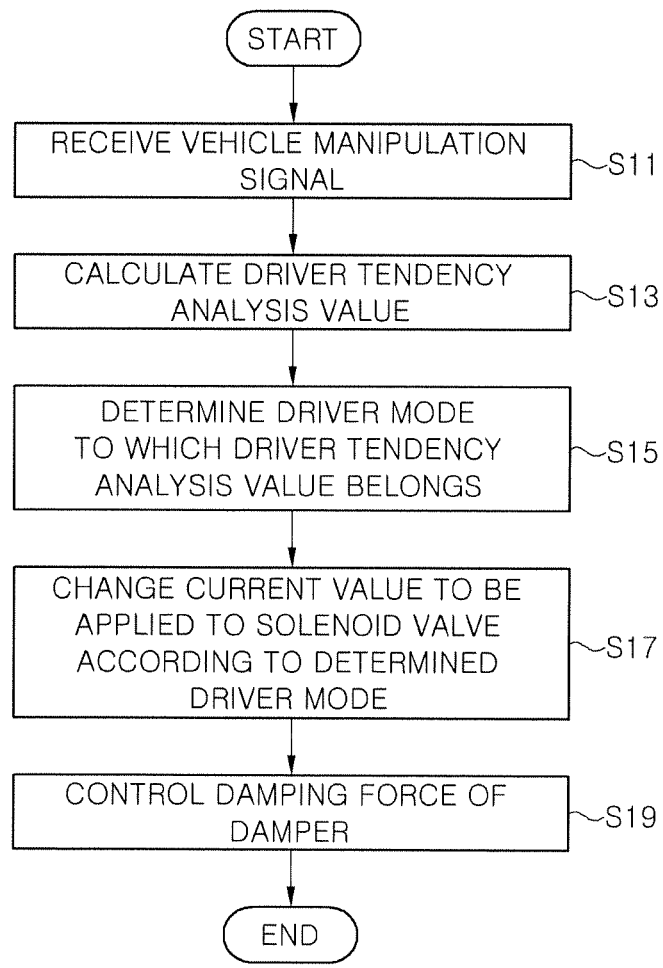

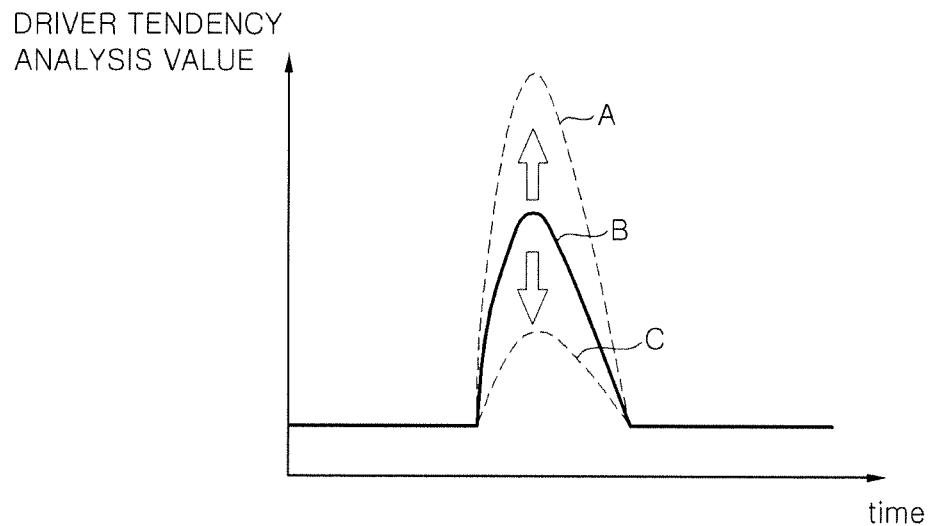

ELECTRONIC CONTROL SUSPENSION APPARATUS AND DAMPING FORCE CONTROLLING METHOD THEREOF

CROSS-REFERENCE(S) TO RELATED APPLICATION

This application claims the benefit of Korean Patent Application No. 10-2015-0069051, filed on May 18, 2015, in the Korean Intellectual Property Office, the disclosure of which is incorporated herein in its entirety by reference.

BACKGROUND OF THE INVENTION

Field of the Invention

The present invention relates to an electronic control suspension apparatus and a damping force controlling method thereof, and more particularly, to an electronic control suspension apparatus and a damping force controlling method thereof, which are capable of controlling a damping force of a damper according to a driver's tendency through a driver tendency analysis without a driver's manipulation of a mode selection switch.

Description of the Related Art

Generally, an electronic control suspension apparatus is a shock absorption apparatus including a shock absorber or a spring between a vehicle shaft and a vehicle frame. The electronic control suspension apparatus functions to alleviate a vertical vibration of a vehicle and alleviate a shock and a vibration applied from a road surface to thereby prevent the shock and the vibration from being transferred to a vehicle body.

The electronic control suspension apparatus may be set to a specific mode by a driver, and a damping force range is differently set according to the set specific mode. For example, when a driver selects a specific mode, e.g., an auto mode, a damping force is provided within a damping force range prestored corresponding to the selected auto mode.

In addition, an electronic control suspension apparatus for improving driving stability and ride comfort is disclosed in Korean Patent Application Laid-Open No. 10-1998-017112 and the like.

Existing electronic control suspension apparatuses, which are disclosed in Korean Patent Application Laid-Open No. 10-1998-017112 and the like, have limitations in that it is necessary for a driver to select a driver mode, e.g., an auto mode or a sport mode, so as to control a damping force of a vehicle, and a damping force according to an existing mode selection providing a prestored damping force range may not meet an individual driver's tendency.

Furthermore, since the existing electronic control suspension apparatuses need to include a mode selection switch for selecting the above-described driver mode, an installation space for the mode selection switch is required in a vehicle, resulting in a rise in unit cost of the vehicle.

PRIOR ART DOCUMENT(S)

Patent Document (Patent Document 1) Korean Patent Application Laid-Open No. 10-1998-017112 (Jun. 5, 1998) entitled "ELECTRONIC CONTROL SUSPENSION APPARATUS AND DAMPING FORCE CONTROLLING METHOD THEREOF"

SUMMARY OF THE INVENTION

An aspect of the present invention is directed to provide an electronic control suspension apparatus and a damping force controlling method thereof, which are capable of controlling a damping force of a damper according to a driver's tendency through a driver tendency analysis without a driver's manipulation of a mode selection switch.

According to an embodiment of the present invention, there is provided an electronic control suspension apparatus for controlling a damping force of a damper installed at each of a front wheel and a rear wheel, the electronic control suspension apparatus including: a reception unit configured to receive a vehicle manipulation signal; a driver tendency analysis unit configured to calculate a driver tendency analysis value by analyzing a driver's driving tendency based on the vehicle manipulation signal received by the reception unit; a driver mode determination unit configured to determine a driver mode to which the driver tendency analysis value calculated by the driver tendency analysis unit belongs; and a damping force control unit configured to control the damping force of the damper by changing a current value to be applied to a solenoid valve according to the determined driver mode.

The driver mode may be divided into a soft mode, a normal mode, and a tough mode, and preset ranges of the driver tendency analysis value may be set with respect to the soft mode, the normal mode, and the tough mode, respectively.

The current value to be applied to the solenoid valve may be predefined for each of the soft mode, the normal mode, and the tough mode.

The current value predefined for the soft mode may be greater than the current value predefined for the normal mode, and the current value predefined for the normal mode may be greater than the current value predefined for the tough mode.

The vehicle manipulation signal may include one or more signals selected from an acceleration manipulation signal, a deceleration manipulation signal, and a steering angle signal, and the driver tendency analysis unit may calculate the driver tendency analysis value by using at least one of an amplitude, a gradient, and an occurrence frequency of each of the one or more signals included in the vehicle manipulation signal.

The driver tendency analysis unit may compare an n-th order differential value of an amplitude of each of one or more signals included in the vehicle manipulation signal with a preset reference value and calculate the driver tendency analysis value based on a tough number exceeding the preset reference value.

The driver tendency analysis unit may calculate n-th order differential values of the vehicle manipulation signal, compare each of the n-th order differential values of the vehicle manipulation signal with a preset reference value to count a tough number exceeding the preset reference value and a soft number equal to or less than the preset reference value in a unit section, and calculate the driver tendency analysis value by using the counted tough number, the counted soft number, and a driver's manipulation number.

The driver mode determination unit may determine the range to which the calculated driver tendency analysis value belongs among the ranges of the driver tendency analysis value set with respect to the soft mode, the normal mode, and the tough mode, and determine a mode, which corresponds to the range to which the calculated driver tendency analysis value belongs, as the driver mode.

The electronic control suspension apparatus may further include a storage unit configured to store a current value that is set for each driver mode and is applied to the solenoid valve, wherein the damping force control unit extracts a current value set to the determined driver mode from the storage unit and applies the extracted current value to the solenoid valve.

According to another embodiment of the present invention, there is provided a damping force controlling method of an electronic control suspension apparatus for controlling a damping force of a damper installed at each of a front wheel and a rear wheel, the method including: receiving a vehicle manipulation signal; calculating a driver tendency analysis value by analyzing a driver's driving tendency based on the received vehicle manipulation signal; determining a driver mode to which the driver tendency analysis value belongs; and controlling the damping force of the damper by changing a current value to be applied to a solenoid valve according to the determined driver mode.

The vehicle manipulation signal may include one or more signals selected from an acceleration manipulation signal, a deceleration manipulation signal, and a steering angle signal, and the calculating of the driver tendency analysis value may include calculating the driver tendency analysis value by using the at least one of an amplitude, a gradient, and an occurrence frequency of each of the one or more signals included in the vehicle manipulation signal.

The calculating of the driver tendency analysis value may include comparing an n-th order differential value of an amplitude of each of one or more signals included in the vehicle manipulation signal with a preset reference value and calculating the driver tendency analysis value based on a tough number exceeding the preset reference value.

The calculating of the driver tendency analysis value may include calculating n-th order differential values of the vehicle manipulation signal and comparing each of the n-th order differential values of the vehicle manipulation signal with a preset reference value to count a tough number exceeding the preset reference value and a soft number equal to or less than the preset reference value in a unit section; and calculating the driver tendency analysis value by using the counted tough number, the counted soft number, and a driver's manipulation number.

The determining of the driver mode may include: determining the range to which the calculated driver tendency analysis value belongs among the ranges of the driver tendency analysis value set with respect to the soft mode, the normal mode, and the tough mode; and determining a mode, which corresponds to the range to which the calculated driver tendency analysis value belongs, as the driver mode.

The method may further include storing, in a storage unit, a current value that is set for each driver mode and is applied to the solenoid valve, wherein the controlling of the damping force of the damper includes: extracting a current value set to the determined driver mode from the storage unit; and applying the extracted current value to the solenoid valve.

BRIEF DESCRIPTION OF THE DRAWINGS

FIGS. 2A-2C are diagrams for describing an operation of a driver tendency analysis unit illustrated in FIG. 1.

FIG. 3 is a flowchart of a damping force controlling method of an electronic control suspension apparatus, according to an embodiment of the present invention.

FIG. 4 is a table for describing a driver mode.

FIG. 5 is a graph showing an example in which a driver mode is automatically changed according to a driver tendency analysis value.

DETAILED DESCRIPTION OF EMBODIMENTS

Hereinafter, exemplary embodiments of the present invention will be described in detail with reference to the accompanying drawings.

Figure 1:
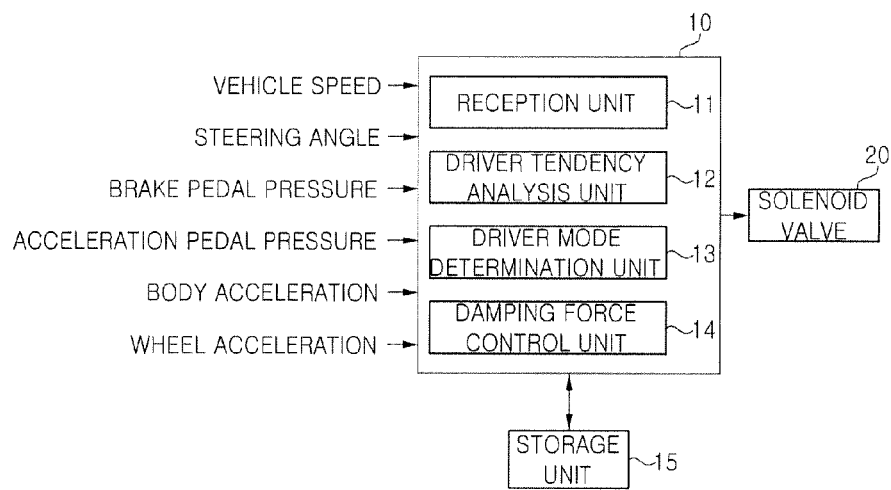
FIG. 1 is a block diagram of an electronic control suspension apparatus according to an embodiment of the present invention.

FIG. 1 is a block diagram of an electronic control suspension apparatus according to an embodiment of the present invention, and FIGS. 2A-2C are diagrams for describing an operation of a driver tendency analysis unit illustrated in FIG. 1.

Referring to FIG. 1, the electronic control suspension apparatus according to the embodiment of the present invention may include an electronic control unit 10 that controls a damping force of a damper so as to provide ride comfort and handling performance by taking into account a driver' tendency, and a solenoid valve 20 that is disposed at the damper of a vehicle wheel and adjusts the damping force of the damper under control of the electronic control unit 10.

The electronic control unit 10 may include a reception unit 11 that receives a vehicle manipulation signal generated according to a driver's manipulation of a vehicle, a driver tendency analysis unit 12 that calculates a driver tendency analysis value by analyzing the vehicle manipulation signal, a driver mode determination unit 13 that determines a driver mode to which the driver tendency analysis value belongs, and a damping force control unit 14 that controls the damping force of the damper by changing a current value to be applied to the solenoid valve 20 according to the driver mode determined by the driver mode determination unit 13.

The vehicle manipulation signal may include an acceleration manipulation signal, a deceleration manipulation signal, a steering angle signal, a vehicle speed signal, a body acceleration signal, a wheel acceleration signal, and the like.

The acceleration manipulation signal may mean a signal generated by sensing a driver's operation of manipulating an acceleration pedal and the like and may be sensed by an acceleration position sensor. The acceleration position sensor may include one or more sensors installed on the same shaft as the acceleration pedal and may sense a degree in which a driver presses the acceleration pedal and output the sensed degree. Generally, the acceleration position sensor may be electronically or mechanically constituted and may output a signal according to a driver's manipulation of the acceleration pedal, e.g., an acceleration pedal pressure. Therefore, the acceleration manipulation signal included in the vehicle manipulation signal may include information about a signal or a driver's habit to manipulate the acceleration pedal so as to accelerate the vehicle.

The deceleration manipulation signal may mean a signal generated by sensing a driver's operation of manipulating a brake pedal and the like. For example, the deceleration manipulation signal may be sensed by a brake pressure sensor. When a driver manipulates the brake pedal so as to decelerate the vehicle, the brake pressure sensor may function to sense a pressure applied to the brake pedal. Therefore, the deceleration manipulation signal included in the vehicle manipulation signal may include information about a user's habit or tendency to manipulate the brake pedal.

The steering angle signal may be sensed by a steering angle sensor, a torque angle sensor, or the like, and may include information about an angle at which a driver manipulates a steering wheel so as to steer the vehicle. That is, the steering angle signal may be a signal generated according to a driver's manipulation of a driving direction of a vehicle, and may include information about a driver's habit or tendency to manipulate the steering wheel.

The reception unit 11 may receive the vehicle manipulation signal from each sensor through an in-vehicle communication network (for example, a controller area network (CAN)).

The driver tendency analysis unit 12 may calculate the driver tendency analysis value by analyzing the driver's tendency based on the vehicle manipulation signal received by the reception unit 11.

More specifically, the driver tendency analysis unit 12 may calculate the driver tendency analysis value by analyzing information about at least one of an amplitude, a gradient, and an occurrence frequency of each of one or more signals included in the vehicle manipulation signal.

Referring to FIGS. 2A-2C, the vehicle manipulation signal may be received as a value having a specific signal amplitude according to time. For example, the acceleration manipulation signal may include different signal amplitudes in a time series manner according to the driver's manipulation of the acceleration pedal as illustrated in FIG. 2A.

In this case, the driver tendency analysis unit 12 may calculate the driver tendency analysis value by using information about at least one of an amplitude, a gradient, and an occurrence frequency of a relevant signal. As illustrated in FIG. 2A, the driver tendency analysis unit 12 may calculate the driver tendency analysis value according to a relevant detection number by checking cases (No. 9 and No. 12) where a signal having an amplitude of a preset reference value (30) or more is detected.

Alternatively, the driver tendency analysis unit 12 may calculate the driver tendency analysis value by using an n-th order differential value of the vehicle manipulation signal as illustrated in FIGS. 2A and 2B. That is, the driver tendency analysis unit 12 may compare an n-th order differential value of an amplitude of each of one or more signals with a preset reference value and calculate the driver tendency analysis value based on a tough number exceeding the preset reference value.

Referring to FIGS. 2A and 2B, a speed component of a signal may be calculated by performing a first-order differentiation on an amplitude of the signal, and an acceleration component of the signal may be obtained by performing a differentiation on the speed component. As illustrated in FIG. 2C, the driver tendency analysis unit 12 may calculate an acceleration component of each vehicle manipulation signal and compare the calculated acceleration component with a preset reference value and calculate the driver tendency analysis value based on a tough number exceeding the preset reference value. The acceleration component of the signal may include information about how rapidly an amplitude of the signal is changed, and may provide meaningful information for grasping a driver's tendency such as quick acceleration, quick deceleration, or quick steering. In addition, since the amplitude of the signal also provides a variety of information about magnitude of acceleration, magnitude of deceleration, magnitude of steering, ant the like, the amplitude of the signal may be used as a factor for grasping the driver's tendency.

While the example of analyzing the signal by performing the n-th order differentiation on the signal has been described, the signal may be analyzed by using various signal modifying methods, for example, a method of integrating a signal or a method of adding up specific sections of a signal and comparing the added-up values with a reference value. That is, the driver tendency analysis value may be calculated by converting the vehicle manipulation signal into driver intensity information through an arithmetical calculation equation.

As described above with reference to FIGS. 2A-2C, the driver tendency analysis unit 12 may perform the aforementioned signal analysis on each of one or more signals included in the vehicle manipulation signal and may calculate the driver tendency analysis value by using the relevant analysis result.

More specifically, the driver tendency analysis unit 12 may calculate a driver tendency analysis value (DT) by calculating n-th order differential values of the vehicle manipulation signal, comparing each of the n-th order differential values of the vehicle manipulation signal with a preset reference value to count a tough number exceeding the preset reference value and a soft number equal to or less than the preset reference value in a unit section, and substituting the counted tough number and the counted soft number into Equation 1 below:

$$DT=1+\{(\text{Tough Determination Number}-\text{Soft Determination Number})/\text{Total Action Number}\} \quad \text{[Equation 1]}$$

where "tough determination number" is a count value of the tough number exceeding the preset reference value, "soft determination number" is a count value of the soft number equal to or less than the preset reference value, and "total action number" means a total number of driver's manipulations in the unit section.

Therefore, when a quick action such as a quick acceleration pedal manipulation increases, the driver tendency analysis value may increase. When the quick action decreases, the soft determination number may increase and the driver tendency analysis value may decrease.

The driver mode determination unit 13 may determine a driver mode to which the driver tendency analysis value calculated by the driver tendency analysis unit 12 belongs. The driver mode may be divided into a soft mode, a normal mode, and a tough mode, and a range of a driver tendency analysis value may be set with respect to each of the soft mode, the normal mode, and the tough mode. As illustrated in FIG. 4, a driver tendency analysis value is set to a range of 0.00 to 0.70 with respect to the soft mode, a driver tendency analysis value is set to a range of 0.71 to 1.30 with respect to the normal mode, and a driver tendency analysis value is set to a range of 1.31 to 2.00 with respect to the tough mode. However, the names and the ranges of the soft mode, the normal mode, and the tough mode are not limited to the above examples. As illustrated in FIG. 4, the soft mode may be subdivided into 70 steps, the normal mode may be subdivided into 60 steps, and the tough mode may be subdivided into about 70 steps. However, these are only for convenience of description and the present invention is not limited thereto.

The damping force control unit 14 may control the damping force of the damper by applying a current value to the solenoid valve 20, the current value being set to the driver mode determined by the driver mode determination unit 13.

The range of the driver tendency analysis value set for each driver mode may be stored in a storage unit 15. A current value to be applied to the solenoid valve 20 for each driver mode may also be stored in the storage unit 15. For example, in the case of the soft mode, a current value to be applied to the solenoid valve 20 may be set to 1.6 A, in the case of the normal mode, a current value to be applied to the solenoid valve 20 may be set to 1.0 A, and in the case of the tough mode, a current value to be applied to the solenoid valve 20 may be set to 0.3 A. The set current values may be stored in the storage unit 15. The current value set for each driver mode is merely an example, and the present invention is not limited thereto.

In addition, the damping force control unit 14 may individually control vehicle wheels and may integrally control a damping force according to a vehicle behavior at the time of quick turning, quick braking, or quick accelerating, and a damping force according to a driver's tendency, based on a determination result of a vehicle motion.

Hereinafter, a damping force controlling method of the electronic control suspension apparatus, according to an embodiment of the present invention, will be described.

FIG. 3 is a flowchart of the damping force controlling method of the electronic control suspension apparatus, according to an embodiment of the present invention.

Referring to FIG. 3, the reception unit 11 receives a vehicle manipulation signal (S11). As described above, the vehicle manipulation signal may include an acceleration manipulation signal, a deceleration manipulation signal, a steering angle signal, and the like.

The driver tendency analysis unit 12 calculates a driver tendency analysis value through Equation 1 by analyzing a driver's tendency based on the received vehicle manipulation signal (S13).

The driver mode determination unit 13 determines a driver mode to which the driver tendency analysis value calculated by the driver tendency analysis unit 12 belongs (S15). At this time, the driver mode may be divided into a soft mode, a normal mode, and a tough mode, and ranges of the driver tendency analysis value for the soft mode, the normal mode, and the tough mode may be discriminated from one another. Therefore, the driver mode may be determined by taking into account a driver's tendency without a driver's direct selection of the drive mode.

The damping force control unit 14 changes a current value to be applied to the solenoid valve 20 according to the determined driver mode (S17). The damping force control unit 14 extracts, from the storage unit 15, the current value set to the driver mode, i.e., the soft mode, the normal mode, or the tough mode, and applies the extracted current value to the solenoid valve 20.

The damping force control unit 14 controls a damping force of a damper according to the applied current value (S19).

Therefore, the damping force of the damper may be controlled by applying, to the solenoid valve 20, the current value set to the driver mode determined according to the driver's tendency without a driver's selection of the driver mode. Accordingly, it may be possible to provide different ride comfort and handling performance for each driver, thereby providing maximum driver satisfaction at low cost.

FIG. 5 is a graph showing an example in which a driver mode is automatically changed according to a driver tendency analysis value.

The driver mode determination unit 13 may determine a driver mode among a soft mode, a normal mode, and a tough mode according to a range to which a driver tendency analysis value belongs. In the case of A of FIG. 5, when the driver tendency analysis value is within a maximum reference range of, for example, 1.31 to 2.00, the tough mode is determined as the driver mode. In the case of B of FIG. 5, when the driver tendency analysis value is within a medium reference range of, for example, 0.71 to 1.30, the normal mode is determined as the driver mode. In the case of C of FIG. 5, when the driver tendency analysis value is within a minimum reference range of, for example, 0.00 to 0.70, the soft mode is determined as the driver mode. Therefore, the driver mode according to the driver's tendency may be accurately applied without a driver's selection of the driver mode according to the driver's tendency.

Figure 6:
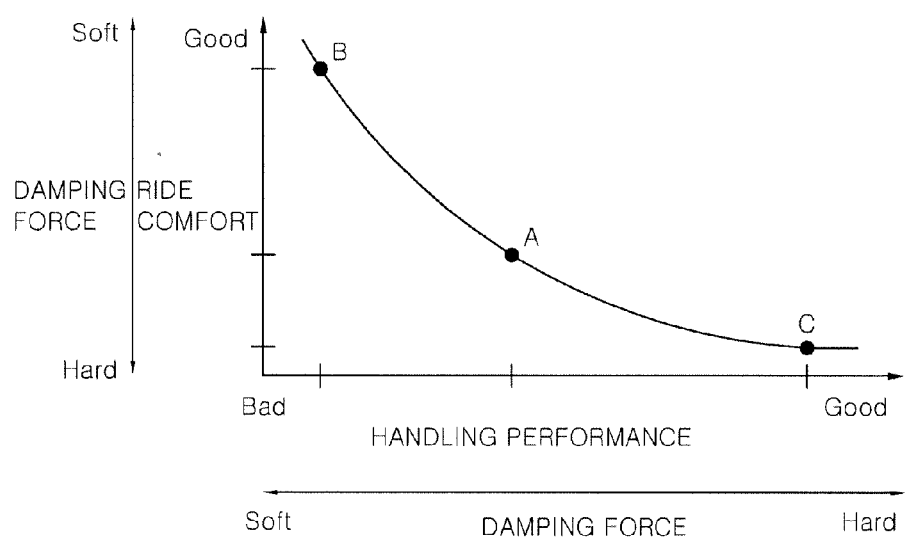
FIG. 6 is a graph showing ride comfort and handling performance for each driver mode.

FIG. 6 is a graph showing ride comfort and handling performance for each driver mode.

In the process of manufacturing a vehicle, a damping force of the vehicle is set to point A of FIG. 6. When the electronic control suspension apparatus according to the embodiment of the present invention is applied, a driver mode may not be divided into an auto mode and a sport mode. Accordingly, when the drive mode to which the driver tendency analysis value belongs is the soft mode (corresponding to an existing auto mode), the damping force may be changed from point A to point B of FIG. 6. Thus, a current value (e.g., 1.6 A) set in association with the soft mode may be applied to the solenoid valve 20. When the driver mode to which the driver tendency analysis value belongs is the tough mode (corresponding to an existing sport mode), the damping force may be changed from point A to point C of FIG. 6. Thus, a current value (e.g., 0.3 A) set in association with the tough mode may be applied to the solenoid valve 20. The current value set to each of the soft mode, the normal mode, and the tough mode may be changed according to purpose.

According to the embodiments of the present invention, it may be possible to control a damping force of a damper according to a driver's tendency through a driver tendency analysis without a driver's manipulation of a mode selection switch. Therefore, since the damping force of the damper is adjusted to meet an individual driver's tendency, it may be possible to further improve ride comfort of the individual driver. Furthermore, since a vehicle does not need to include a mode selection switch therein, it may be possible to more efficiently use the internal space of the vehicle and reduce costs of the vehicle.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

11: reception unit
12: driver tendency analysis unit
13: driver mode determination unit
14: damping force control unit
15: storage unit
20: solenoid valve

What is claimed is:

1. An electronic control suspension apparatus for controlling a damping force of a damper installed at each of a front wheel and a rear wheel, the electronic control suspension apparatus comprising:
 a reception unit configured to receive a vehicle manipulation signal;
 a driver tendency analysis unit configured to calculate a driver tendency analysis value by analyzing a driver's driving tendency based on the vehicle manipulation signal received by the reception unit;
 a driver mode determination unit configured to determine a driver mode to which the driver tendency analysis value calculated by the driver tendency analysis unit belongs; and a damping force control unit configured to control the damping force of the damper by changing a current value to be applied to a solenoid valve according to the determined driver mode.

2. The electronic control suspension apparatus according to claim 1, wherein
the driver mode is divided into a soft mode, a normal mode, and a tough mode, and
preset ranges of the driver tendency analysis value are set with respect to the soft mode, the normal mode, and the tough mode, respectively.

3. The electronic control suspension apparatus according to claim 2, wherein
the current value to be applied to the solenoid valve is predefined for each of the soft mode, the normal mode, and the tough mode.

4. The electronic control suspension apparatus according to claim 3, wherein
the current value predefined for the soft mode is greater than the current value predefined for the normal mode, and
the current value predefined for the normal mode is greater than the current value predefined for the tough mode.

5. The electronic control suspension apparatus according to claim 1, wherein
the vehicle manipulation signal includes one or more signals selected from an acceleration manipulation signal, a deceleration manipulation signal, and a steering angle signal, and
the driver tendency analysis unit calculates the driver tendency analysis value by using at least one of an amplitude, a gradient, and an occurrence frequency of each of the one or more signals included in the vehicle manipulation signal.

6. The electronic control suspension apparatus according to claim 1, wherein
the driver tendency analysis unit
compares an n-th order differential value of an amplitude of each of one or more signals included in the vehicle manipulation signal with a preset reference value and
calculates the driver tendency analysis value based on a tough number exceeding the preset reference value.

7. The electronic control suspension apparatus according to claim 1, wherein
the driver tendency analysis unit
calculates n-th order differential values of the vehicle manipulation signal,
compares each of the n-th order differential values of the vehicle manipulation signal with a preset reference value to count a tough number exceeding the preset reference value and a soft number equal to or less than the preset reference value in a unit section, and
calculates the driver tendency analysis value by using the counted tough number, the counted soft number, and a driver's manipulation number.

8. The electronic control suspension apparatus according to claim 2, wherein
the driver mode determination unit
determines the range to which the calculated driver tendency analysis value belongs among the ranges of the driver tendency analysis value set with respect to the soft mode, the normal mode, and the tough mode, and
determines a mode, which corresponds to the range to which the calculated driver tendency analysis value belongs, as the driver mode.

9. The electronic control suspension apparatus according to claim 1, further comprising
a storage unit configured to store a current value that is set for each driver mode and is applied to the solenoid valve,
wherein the damping force control unit
extracts a current value set to the determined driver mode from the storage unit and
applies the extracted current value to the solenoid valve.

10. A damping force controlling method of an electronic control suspension apparatus for controlling a damping force of a damper installed at each of a front wheel and a rear wheel, the method comprising:
receiving a vehicle manipulation signal;
calculating a driver tendency analysis value by analyzing a driver's driving tendency based on the received vehicle manipulation signal;
determining a driver mode to which the driver tendency analysis value belongs; and
controlling the damping force of the damper by changing a current value to be applied to a solenoid valve according to the determined driver mode.

11. The method according to claim 10, wherein
the vehicle manipulation signal includes one or more signals selected from an acceleration manipulation signal, a deceleration manipulation signal, and a steering angle signal, and
the calculating of the driver tendency analysis value comprises calculating the driver tendency analysis value by using the at least one of an amplitude, a gradient, and an occurrence frequency of each of the one or more signals included in the vehicle manipulation signal.

12. The method according to claim 10, wherein
the calculating of the driver tendency analysis value comprises
comparing an n-th order differential value of an amplitude of each of one or more signals included in the vehicle manipulation signal with a preset reference value and
calculating the driver tendency analysis value based on a tough number exceeding the preset reference value.

13. The method according to claim 10, wherein
the calculating of the driver tendency analysis value comprises
calculating n-th order differential values of the vehicle manipulation signal and
comparing each of the n-th order differential values of the vehicle manipulation signal with a preset reference value to count a tough number exceeding the preset reference value and a soft number equal to or less than the preset reference value in a unit section; and
calculating the driver tendency analysis value by using the counted tough number, the counted soft number, and a driver's manipulation number.

14. The method according to claim 10, wherein
the determining of the driver mode comprises:
determining the range to which the calculated driver tendency analysis value belongs among the ranges of the driver tendency analysis value set with respect to the soft mode, the normal mode, and the tough mode; and determining a mode, which corresponds to the range to which the calculated driver tendency analysis value belongs, as the driver mode.

15. The method according to claim 10, further comprising storing, in a storage unit, a current value that is set for each driver mode and is applied to the solenoid valve,
wherein the controlling of the damping force of the damper comprises:
extracting a current value set to the determined driver mode from the storage unit; and
applying the extracted current value to the solenoid valve.

* * * * *